(12) United States Patent
Bytheway

(10) Patent No.: US 9,507,968 B2
(45) Date of Patent: Nov. 29, 2016

(54) FLYING SENSE ELECTRODES FOR CREATING A SECURE CAGE FOR INTEGRATED CIRCUITS AND PATHWAYS

(71) Applicant: CIRQUE CORPORATION, Salt Lake City, UT (US)

(72) Inventor: Jared G. Bytheway, Sandy, UT (US)

(73) Assignee: CIRQUE CORPORATION, Salt Lake City, UT (US)

(*) Notice: Subject to any disclaimer, the term of this patent is extended or adjusted under 35 U.S.C. 154(b) by 53 days.

(21) Appl. No.: 14/216,549

(22) Filed: Mar. 17, 2014

(65) Prior Publication Data

US 2014/0283148 A1 Sep. 18, 2014

Related U.S. Application Data

(60) Provisional application No. 61/794,103, filed on Mar. 15, 2013.

(51) Int. Cl.
*G06F 21/87* (2013.01)

(52) U.S. Cl.
CPC ..... *G06F 21/87* (2013.01); *H01L 2224/48091* (2013.01); *H01L 2224/48227* (2013.01); *H01L 2924/19107* (2013.01)

(58) Field of Classification Search
CPC .................................... G06F 21/87
USPC ............................................. 726/34
See application file for complete search history.

(56) References Cited

U.S. PATENT DOCUMENTS

| | | | |
|---|---|---|---|
| 4,103,252 A * | 7/1978 | Bobick | G06F 3/03547 200/52 R |
| 4,186,392 A | 1/1980 | Holz | |
| 4,550,221 A * | 10/1985 | Mabusth | G06F 3/03547 178/18.06 |
| 4,953,971 A | 9/1990 | Highfill | |
| 4,991,146 A | 2/1991 | Ransdell | |
| 5,283,559 A | 2/1994 | Kalendra | |
| 5,305,017 A | 4/1994 | Gerpheide | |
| 5,345,807 A | 9/1994 | Butts | |
| 5,905,489 A * | 5/1999 | Takahama | G06F 3/044 345/156 |
| 5,943,044 A * | 8/1999 | Martinelli | G06F 3/03547 178/18.01 |
| 6,092,410 A | 7/2000 | Kaehler | |
| 6,097,606 A | 8/2000 | Groves | |
| 6,222,528 B1 * | 4/2001 | Gerpheide | G06F 3/044 345/173 |
| 6,715,078 B1 | 3/2004 | Chasko | |
| 7,564,449 B2 * | 7/2009 | Layton | G06F 3/03547 345/173 |
| 8,123,133 B2 | 2/2012 | Dubois | |
| 8,656,778 B2 * | 2/2014 | Guo | G01P 15/125 73/514.32 |
| 9,141,224 B1 * | 9/2015 | Rowe | G06F 3/0414 |
| 2001/0033012 A1 | 10/2001 | Kommerling et al. | |
| 2002/0002683 A1 | 1/2002 | Benson | |

(Continued)

FOREIGN PATENT DOCUMENTS

WO 2004068521 A1 8/2004

OTHER PUBLICATIONS

O'Connor, "mTouch Projected Capacitive Touch Screen Sensing Theory of Operation", 2010.*

*Primary Examiner* — Ondrej Vostal
(74) *Attorney, Agent, or Firm* — Morriss O'Bryant Compagni, PC

(57) ABSTRACT

A system and method for disposing one or a plurality of flying sense electrode segments so as to physically cover integrated circuits, circuit pathways and other components on at least one circuit board to physically secure the circuits, pathways and components from probes or data interception.

20 Claims, 6 Drawing Sheets

(56) References Cited

U.S. PATENT DOCUMENTS

| | | | |
|---|---|---|---|
| 2004/0178995 A1 | 9/2004 | Sterling | |
| 2004/0224084 A1* | 11/2004 | Guido | C09K 11/7733 427/69 |
| 2004/0239535 A1 | 12/2004 | Chadwell | |
| 2005/0014146 A1* | 1/2005 | Manaresi | B03C 5/005 435/6.12 |
| 2005/0035955 A1 | 2/2005 | Carter | |
| 2006/0108920 A1* | 5/2006 | Yang | H01L 51/5237 313/512 |
| 2007/0070047 A1 | 3/2007 | Jeon | |
| 2008/0278355 A1* | 11/2008 | Moore | G06F 3/044 341/33 |
| 2009/0114917 A1* | 5/2009 | Yamazaki | H01L 29/78696 257/59 |
| 2009/0146270 A1 | 6/2009 | Buer et al. | |
| 2010/0148175 A1* | 6/2010 | Godo | H01L 29/78696 257/57 |
| 2010/0201631 A1* | 8/2010 | Taylor | G06F 3/0416 345/173 |
| 2010/0328208 A1* | 12/2010 | Austin | G06F 3/044 345/157 |
| 2010/0328253 A1* | 12/2010 | Paulsen | G06F 3/044 345/174 |
| 2011/0006787 A1* | 1/2011 | Kadono | G06F 3/041 324/658 |
| 2011/0084920 A1* | 4/2011 | Glad | G06F 3/044 345/173 |
| 2011/0090169 A1* | 4/2011 | Karhiniemi | G06F 3/04883 345/173 |
| 2011/0115717 A1* | 5/2011 | Hable | G06F 3/0416 345/173 |
| 2011/0232975 A1* | 9/2011 | Kim | G06F 3/044 178/18.03 |
| 2012/0092296 A1* | 4/2012 | Yanase | G06F 3/0416 345/174 |
| 2012/0113038 A1* | 5/2012 | Chen | G06F 3/0412 345/173 |
| 2012/0113051 A1* | 5/2012 | Bird | H04B 13/005 345/174 |
| 2012/0206407 A1* | 8/2012 | Taylor | G06F 3/044 345/174 |
| 2012/0280923 A1* | 11/2012 | Vincent | G06F 3/044 345/173 |
| 2013/0038338 A1* | 2/2013 | Lipasti | G06F 3/044 324/658 |
| 2013/0106709 A1* | 5/2013 | Simmons | G06F 3/044 345/173 |
| 2013/0120310 A1* | 5/2013 | Siska | H03K 17/962 345/174 |
| 2013/0154719 A1* | 6/2013 | Lee | G06F 3/041 327/517 |
| 2013/0162583 A1* | 6/2013 | Simmons | G06F 3/044 345/174 |
| 2013/0278540 A1* | 10/2013 | Yilmaz | G06F 3/0416 345/174 |
| 2013/0326583 A1* | 12/2013 | Freihold | G06F 3/04815 726/3 |
| 2014/0002114 A1* | 1/2014 | Schwartz | G06F 3/044 324/679 |
| 2014/0049504 A1* | 2/2014 | Cok | G06F 3/0412 345/174 |
| 2014/0070797 A1* | 3/2014 | Carley | G01D 5/2415 324/207.13 |
| 2014/0299365 A1* | 10/2014 | Sebastian | G06F 3/044 174/255 |

* cited by examiner

FLYING SENSE ELECTRODES FOR CREATING A SECURE CAGE FOR INTEGRATED CIRCUITS AND PATHWAYS

BACKGROUND OF THE INVENTION

Field of the Invention

This invention relates generally to touch sensors and secure digital communication pathways between components in a touch sensor that enable the secure entry of data to a touch sensor. More specifically, the present invention disposes one or a plurality of flying sense electrodes so as to physically cover integrated circuits, circuit pathways and other components on a circuit board to physically secure the items from probes.

Description of Related Art

There are several designs for capacitance sensitive touch sensors. It is useful to examine the underlying technology to better understand how capacitance sensitive circuitry may be modified to work with the present invention.

The CIRQUE® Corporation touchpad includes capacitance sensitive circuitry that is combined with a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad and capacitance sensing circuitry described above uses a grid of X and Y electrodes 12, 14 and a separate and single sense electrode 16, the sense electrode can actually be the X or Y electrodes 12, 14 by using multiplexing.

It would be an advantage to use a touch sensor having the circuitry as described to secure sense electrodes that are physically arranged in a pattern to cover unsecured components and pathways without creating an airtight seal.

BRIEF SUMMARY OF THE INVENTION

In a preferred embodiment, the present invention is a system and method for disposing one or a plurality of flying sense electrode segments so as to physically cover integrated circuits, circuit pathways and other components on at least one circuit board to physically secure the circuits, pathways and components from probes or data interception.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
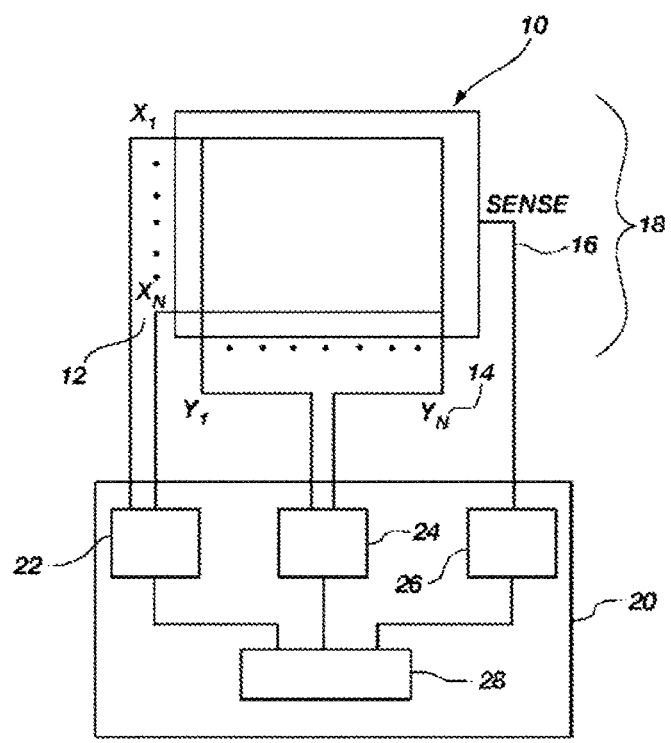
FIG. 1 is a block diagram of the components of a capacitance-sensitive touchpad as made by CIRQUE® Corporation and which can be operated in accordance with the principles of the present invention.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should be understood that use of the term "touch sensor" throughout this document includes any capacitive touch sensor device, including touchpads, touch screens and touch panels, and includes proximity and touch sensing capabilities.

It should be understood that touch sensor circuitry may be adapted for the present invention in a dedicated form where the present invention is only providing security, or in a shared arrangement where the touch sensor circuitry provides touch sensor functions and security functions at the same time.

Previous technology for securing a touch sensor is directed to the concept of protecting an operating volume. An operating volume is a space or device within which a touch sensor and its components such as touch sensing circuitry are disposed. For example, an operating volume may be a housing of a point-of-sale (POS) terminal. A touch sensor and its associated touch sensing circuitry may be disposed within the POS terminal. Electrodes may be disposed around the inside of the POS terminal in order to sense the space within the POS terminal. If there are changes within the POS terminal such as a probe or other object that is penetrating the POS terminal in order to insert an electrode for intercepting communication of the touch sensor or any other circuitry with which the touch sensor communicates, the probe may be detected by the present invention.

The prior art also teaches providing increased security for digital communications by focusing detecting efforts on individual communication lines. These communication lines may belong to any component and not to just the touch sensor. The present invention is directed to detection of a probe that is in proximity of or making direct contact with component that is being protected, or detection of a probe or other device that may attempt to intercept signals on an electrode that is carrying information. The electrode may transmit data between two integrated circuits. The integrated circuits may provide any function.

Other methods to secure integrated circuits include metal meshes on the silicon that is done at the time of fabricating the integrated circuits, etch resistant epoxy, mixing up memory locations, mixing up data pathways etc. Another less effective deterrent is to encapsulate the integrated circuit with an epoxy or other similar material that may provide security because it may be difficult to remove and may be very difficult to probe through.

Two general categories for securing data are to be tamper resistance or tamper responsive. If a system is completely tamper proof, there is no need for a tamper response. Since being completely tamper proof may realistically be too difficult to achieve, being tamper responsive may be an important element of the present invention.

When using secure data, there may be a requirement to have sensitive but unencrypted data travel from one integrated circuit to another. The present invention is a system and method for enclosing the integrated circuit and the communication pathways between them in a secure fashion.

It is noted that when components are referred to, this term may include integrated circuits, communication pathways, or both.

A first embodiment of the present invention provides a tamper resistant secure cage to protect integrated circuits or communication pathways by enclosing them in an electric field sensing system using a capacitive sending circuit. The electric field may be generated by protection electrodes that are disposed around the components to be protected.

Figure 2:
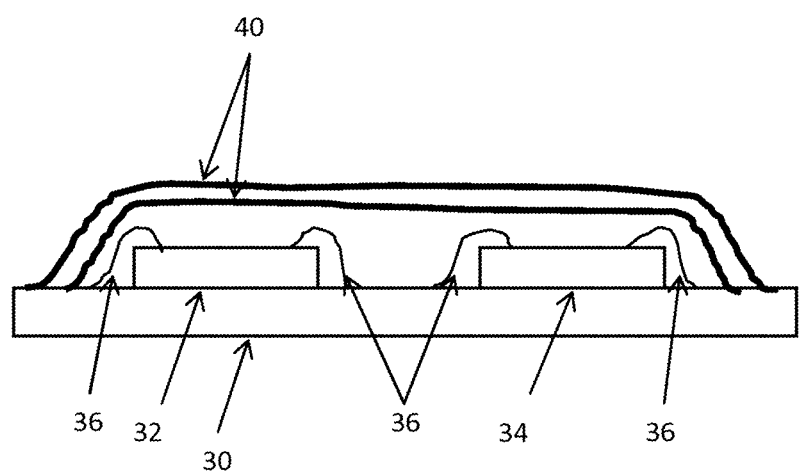
FIG. 2 is a profile view of a substrate, integrated circuits and a communication pathway between them that requires protection, and two flying sense electrodes that are used to create a secure cage around the components.

FIG. 2 shows that the first embodiment is to mount one or more bare dies 32, 34 on a substrate 30 and wire bond the dies to the substrate or to each other. The dies 32, 34 are bonded to the substrate or to each other through the wire bonds 36 that also form communication pathways.

The process described above is a typical manner for mounting the dies or integrated circuits 32, 34 on a substrate 30. In this first embodiment, at least one of the integrated circuits will be a capacitive touch controller. Alternatively, the capacitive touch controller may be on a different substrate which has sense electrodes that extend from the capacitive touch controller to the substrate 30. However, in this first embodiment, one or more of the sense electrodes 40 from the capacitive touch controller may be wirebonded to the substrate 30 to be used for the monitoring, sensing or intrusion detection performed by the secure cage of flying sense electrode segments 40 (which may also be referred to as "flying sense electrodes").

Figure 3:
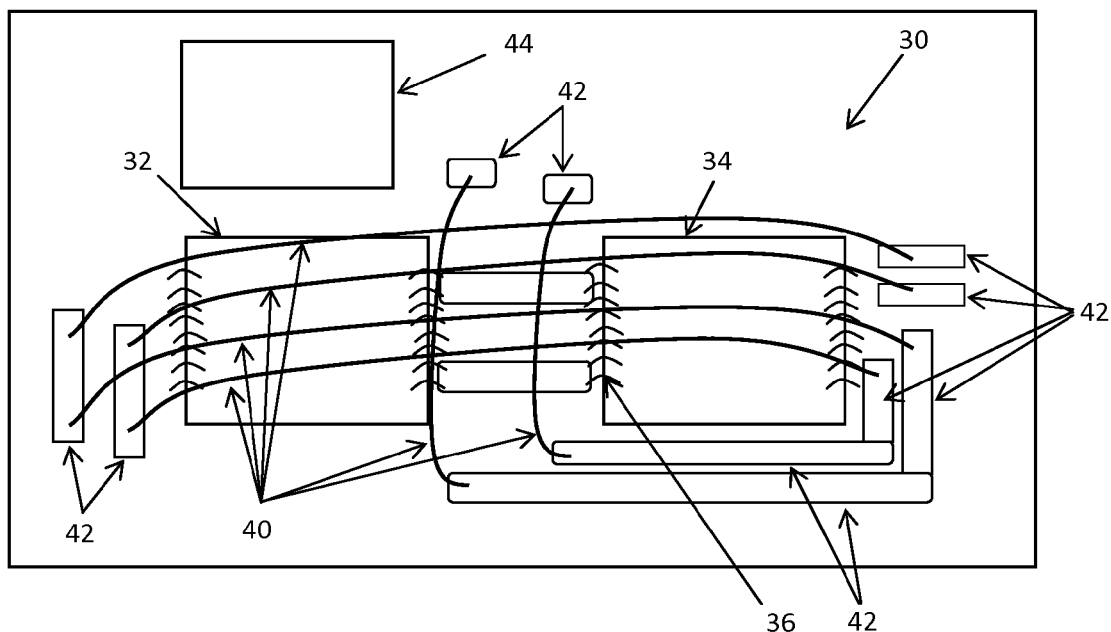
FIG. 3 is a top view diagram showing the elements of FIG. 2 from above, but now showing the traces on the substrate that connect the flying sense electrodes.

FIG. 3 is a second embodiment that shows a top view of the substrate 30. In this second embodiment, the capacitive touch controller 44 is disposed on the substrate 30. In addition, there may be segments 42 of traces on the substrate for creating a daisy chain of flying sense electrodes 40 and interconnecting substrate segments 42. When the flying sense electrodes 40 are daisy chained together, they may form a single sense electrode.

In this second embodiment, the flying sense electrodes 40 are shown forming a pattern where some are overlapping each other instead of all being parallel to each other. This overlapping of the flying sense electrodes 40 generally creates more complete coverage of the protected components 32, 34, 36.

The term "flying" is used to describe the sense electrodes 40 as being disposed in the space over the integrated circuits 32, 34 and the wire bonds 36. The sense electrodes may conform to whatever space is available for them to be disposed over the integrated circuits 32, 34 and interconnecting substrate segments 42 that are being protected.

The flying sense electrodes 40 arc over the integrated circuits 32, 34 and interconnecting substrate segments 42 that are being protected. The flying sense electrodes may be attached to the substrate 30 using segments 42 on either side of the protected components. Additional flying sense electrodes 40 may be disposed over the protected components 32, 34, 36 and bonded to the segments 42 such that the flying sense electrodes may all be in series and physically positioned so that a secure cage is formed with the flying sense electrodes. The flying sense electrodes 40 may all cross each other, without touching, and form an overlapping orthogonal pattern as shown in FIG. 3.

If a mutual capacitance touch sensor is to operate at the same time as the touch sensor is monitoring the protected components 32, 34, 36, then it may be necessary to use a specific pattern of flying sense electrodes 40 where flying sense electrodes and drive electrodes have alternating positions. However, if the touch sensor is being used in a self-capacitance mode of operation, there should be at least two flying sense electrodes interdigitated and alternately driven.

Figure 4:
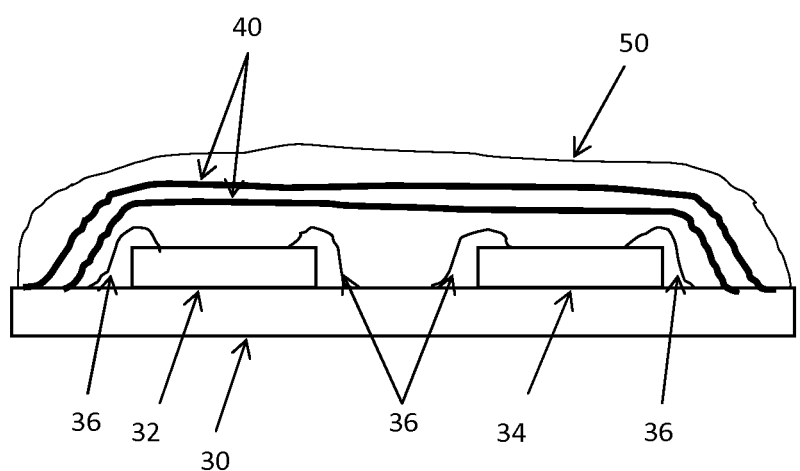
FIG. 4 is a profile view of FIG. 2 but showing an epoxy material disposed on top of the integrated circuits, the flying sense electrodes and the communication pathways.

FIG. 4 is provided to show a third embodiment of the present invention. After the secure cage is formed from the flying sense electrodes 40, the protected components 32, 34, 36 and the flying sense electrodes 40 may be encapsulated using an epoxy material or other security material 50. The security material 50 may be substantially opaque in order to hide the locations of the flying sense electrodes 40.

Once the security material is in place, the capacitive touch controller 44 may be activated in order to perform baseline flying sense electrode measurements. These baseline measurements may be recorded. These baseline measurements may be compared with subsequent periodic flying sense electrode measurements, or integrity measurements, in order to detect changes. Changes between the baseline measurements and periodic flying sense electrode measurements may be an indication that a change has occurred in the secure cage formed by the flying sense electrodes 40. This change is most likely to be the introduction of an object that changes the capacitance of the flying sense electrodes 40. An object that causes this change is most likely to be a probe that is introduced in an attempt to eavesdrop on data that is being transmitted by the protected components 32, 34, 36.

Once the first, second or third embodiments of the invention are disposed within a device and the baseline flying sense electrode measurements are taken and recorded, it may then be necessary to perform periodic integrity measurements of the flying sense electrodes 40. These periodic integrity measurements may be performed as often as necessary to ensure the integrity of the protected components 32, 34, 36. For example, they may be performed at start-up and then continue at convenient periodic intervals. It should be understood that these baseline and periodic integrity measurements may be made with either end of the flying sense electrodes 40 by driving high, driving low or being tri-stated. Furthermore, periodic intervals should be considered to be any time period as small as 1 microsecond to as long as once per day.

Besides the introduction of a probe, other changes in the subsequent flying sense electrode measurements may be caused by movement of any of the protected components 32, 34, 36, movement of the flying sense electrodes 40, a new connection to any of the protected components or the flying sense electrodes, removal of any of the security material 40 around the flying sense electrodes or the protected components, or changes to the substrate 30.

If the periodic integrity measurements are different than the baseline flying sense electrode measurements, then the embodiment of the present invention may take action to prevent the loss or interception of data from the protected components 32, 34, 36. The actions that may be taken include, but should not be considered as limited to, disabling operation of the protected components 32, 34, 36, transmitting a signal to another integrated circuit or to another device so that some other device may take action, or erasing data stored in the protected components.

The present invention is capable of detecting the presence of a probe on or near a single communication pathway electrode 36 that may transmit secure data, or on a plurality of communication pathway electrodes.

Figure 5:
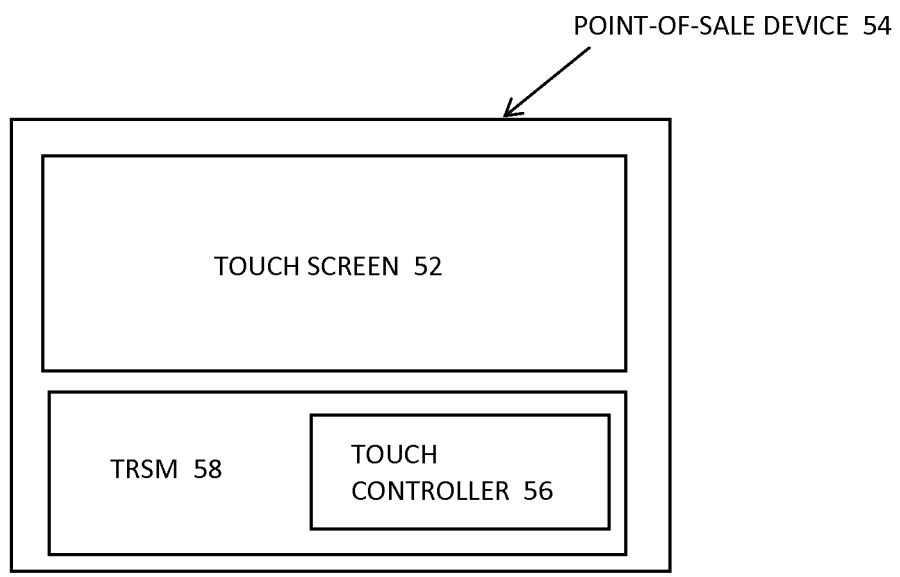
FIG. 5 is a block diagram showing where the present invention may be disposed in a point-of-sale device to protect critical elements requiring greater security or protection from probes.

FIG. 5 shows one application of the present invention is in a financial transaction. A user may have to enter a personal identification number (PIN) on a touch screen 52 of a point-of-sale (POS) terminal 54. The PIN data may have to be transmitted from the touch screen 52 in order to confirm the accuracy of the PIN data. The touch screen 52 may include a capacitive touch controller 56 that may need to transmit the data to another component within the POS terminal 54 in order to verify PIN data.

Payment industry standards require protecting PIN data from being accessible by a probe that may try to capture signals from the touch screen 52. The integrated circuits and electrodes for connecting a capacitive touch controller 56 and a microprocessor may be disposed within a Tamper Resistant Security Module (TRSM) 58. The present invention now provides an additional layer of security by providing a secure cage around the integrated circuits of the capacitive touch controller 56.

The present invention may now monitor electrodes transmitting digital communication signals by periodically measuring communication paths including the dielectric between the electrodes being protected and other nearby electrodes that may be strategically placed to sense changes in material such as etching, chipping or adding conductive inks, etc. The present invention may be used to detect any leakage of current or change in bulk capacitance of protected components.

The present invention may also be used to monitor other traces not necessarily associated with the capacitive touch controller communications such as to protect contact card connector and electrodes from probing or insertion of a man-in-the-middle device left in the contact card socket.

Figure 6:
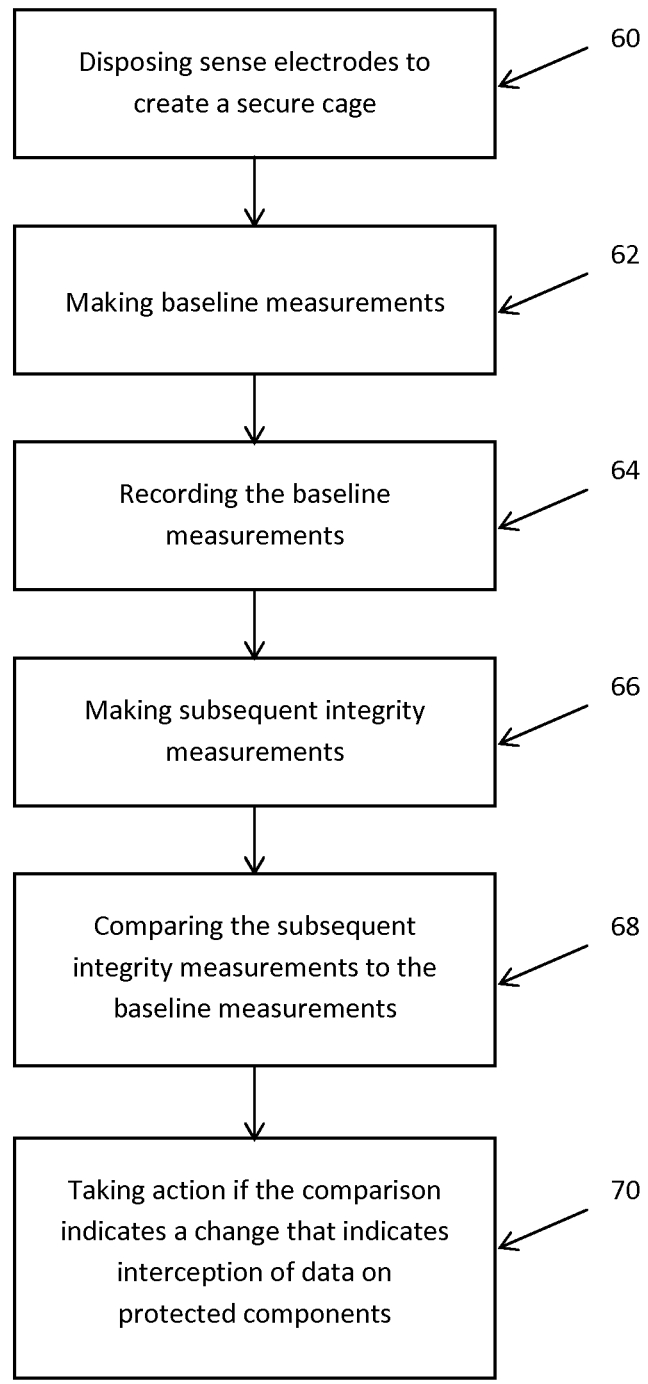
FIG. 6 is a flowchart of the method of an embodiment of the present invention.

Therefore, FIG. 6 shows in a flowchart that the present invention may be used to protect integrated circuits and communication pathways, referred to as protected components, from probing by following the steps of 1) disposing flying sense electrodes that are in electrical proximity to, but preferably surrounding, the communication electrodes to be monitored in a secure cage in item 60 2) making a baseline measurement including bulk capacitance of integrated circuits and communication pathways between them in item 62 3) recording the baseline measurement to be used for making comparisons in item 64, 4) making subsequent integrity measurements in item 66, 5) comparing the subsequent integrity measurements to the baseline measurements in order to determine if there are changes between the subsequent measurements and the baseline measurements in item 68, and 6) taking some action if there are changes in order to prevent the loss of data to a probe or other such means for interception of data on protected components in item 70.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for determining if data is being intercepted or detection of an object near at least one protected component, said method comprising:
providing a substrate upon which are disposed at least one protected component having data, extending segments away from the surface of the substrate and over the at least one protected component to form a secure cage above a surface of the substrate
wherein the plurality of flying sense electrodes are not coplanar with the substrate, and
providing a capacitive touch controller that is coupled to each of the plurality of flying sense electrode segments and detects changes in capacitance on any of the plurality of flying sense electrode segments;

making baseline measurements of the flying sense electrode segments to measure an environment when no object is present;

recording the baseline measurements;

making subsequent integrity measurements on the plurality of flying sense electrode segments;

that indicate the presence of an object; and performing an action if there are changes in capacitance that indicate that data is being intercepted or an object is detected near the at least one protected component.

2. The method as defined in claim 1 wherein the method further comprises selecting the at least one protected component from the group of protected components comprised of integrated circuits circuits and communication pathways.

3. The method as defined in claim 1 wherein the method further comprises disposing a security material around the plurality of flying sense electrode segments and the at least one protected component.

4. The method as defined in claim 3 wherein the method further comprises detecting changes that are selected from the group of changes comprised of movement of the at least one protected component, movement of any of the plurality of flying sense electrode segments, creation of a new connection to the at least one protected component or to any of the plurality of flying sense electrode segments, removal of any of the security material around the plurality of flying sense electrode segments or the at least one protected component, etching, chipping, adding conductive inks, or changes to the substrate.

5. The method as defined in claim 1 wherein the method further comprises selecting the action to be taken if there are changes in capacitance is selected from the group of actions comprised of disabling operation of the at least one protected component, transmitting a signal to another integrated circuit or to another device, or erasing data stored in the at least one protected component.

6. The method as defined in claim 1 wherein the method further comprises making the subsequent integrity measurements at periodic intervals to thereby periodically check for changes in capacitance on the plurality of flying sense electrode segments.

7. The method as defined in claim 1 wherein the method further comprises disposing the plurality of flying sense electrode segments in a daisy chain of interconnected segments of flying sense electrodes.

8. The method as defined in claim 1 wherein the method further comprises disposing the plural of flying sense electrode segments in a pattern wherein some of the plurality of flying sense electrode segments overlap each other relative to the surface of the substrate.

9. A system for determining if a probe is in proximity of or in direct contact with a secure integrated circuit or a secure communication pathway, said system comprised of:

at least one protected component disposed on a substrate;

a plurality of flying sense electrode segments that extend off the surface of the substrate and over the at least one protected component to create a secure cage around the at least one protected component, wherein the plurality of flying sense electrodes are not coplanar with the substrate; and a capacitive touch controller coupled to each of the sense electrode segments and which detects a change in capacitance on any of the plurality of flying sense electrode segments, and for transmitting a signal indicating the change in capacitance.

10. The system as defined in claim 9 wherein the system is further comprised of selecting the at least one protected component from the group of components comprised of integrated circuits and communication pathways.

11. The as defined in claim 9 wherein the system is further comprised of a security material disposed around the plurality of flying sense electrode segments and the at least one protected component.

12. The system as defined in claim 9 wherein the system is further comprised of disposing the plurality of flying sense electrode segments in a daisy chain of interconnected segments of flying sense electrodes.

13. The system as defined in claim 9 wherein the system is further comprised of disposing the plurality of flying sense electrode segments in a pattern wherein some of the plurality of flying sense electrode segments overlap each other relative to the surface of the substrate.

14. A method for protecting data in at least one protected component from being intercepted or detection of an object near the at least one protected component when being transmitted from the at least one protected component, said method comprising:

providing a first substrate upon which are disposed at least one protected component on a substrate and having data, and a plurality of flying sense electrode segments that extend away from the first substrate and over the at least one the at least one protected component to form a secure cage above the surface of the substrate and around the at least one protected component, wherein the plurality of flying sense electrodes are not coplanar with the substrate;

providing a capacitive touch controller on a second substrate and which is coupled to the plurality of flying sense electrode segments and which detects changes in capacitance on the plurality of flying sense electrode segments;

making baseline measurements on each of the flying sense electrode segments to measure an environment when no object is present;

recording the baseline measurements;

making subsequent integrity measurements on the plurality of flying sense electrode segments;

comparing the baseline measurements and the subsequent integrity measurements to determine if there are changes in capacitance on the plurality of flying sense electrode segments that indicate the presence of an object; and performing an action if there are changes in capacitance that indicate that data is being intercepted or an object is detected near the at least one protected component.

15. The method as defined in claim 14 wherein the method further comprises selecting the at least one protected component from the group of protected components comprised of integrated circuits, communication pathways, and the capacitive touch controller.

16. The method as defined in claim 14 wherein the method further comprises disposing a security material around the plurality of flying sense electrode segments and the at least one protected component.

17. The method as defined in claim 16 wherein the method further comprises detecting changes that are selected from the group of changes comprised of movement of any of the at least one protected component, movement of any of the plurality of flying sense electrode segments, movement of the capacitive touch controller, creation of a new connection to the at least one protected component, to any of the plurality of flying sense electrode segments or to the capacitive touch controller, removal of any of the security material around the plural of flying sense electrode segments or the at least one protected component, etching, chipping, adding conductive inks, or changes to the first substrate or to the second substrate.

18. The method as defined in claim 14 wherein the method further comprises selecting the action to be taken if there are changes in capacitance that indicate that data is being intercepted from the at least one protected component, the flying sense electrode segments or the capacitive touch controller is selected from the group of actions comprised of disabling operation of the at least one protected component, transmitting a signal to another integrated circuit or to another device, or erasing data stored in the at least one protected component.

19. The method as defined in claim 14 wherein the method further comprises making the subsequent integrity measurements at periodic intervals to thereby periodically check for changes in capacitance on the plurality of flying sense electrode segments.

20. The method as defined in claim 14 wherein the method further comprises disposing the plurality of flying sense electrode segments in a daisy chain of interconnected segments of flying sense electrodes.

\* \* \* \* \*